US011063926B1

(12) United States Patent
Narayanan et al.

(10) Patent No.: US 11,063,926 B1
(45) Date of Patent: Jul. 13, 2021

(54) DEVICES AND METHODS FOR SINGLE SIGN-ON AND REGULATORY COMPLIANCE

(71) Applicant: CITIBANK, N.A., New York, NY (US)

(72) Inventors: Giridhar Narayanan, Flower Mound, TX (US); Saket Gupta, Bergenfield, NJ (US)

(73) Assignee: CITIBANK, N.A., New York, NY (US)

( * ) Notice: Subject to any disclaimer, the term of this patent is extended or adjusted under 35 U.S.C. 154(b) by 839 days.

(21) Appl. No.: 15/159,587

(22) Filed: May 19, 2016

(51) Int. Cl.
*H04L 29/06* (2006.01)
*H04W 12/04* (2021.01)
*G06F 21/41* (2013.01)

(52) U.S. Cl.
CPC .......... *H04L 63/0815* (2013.01); *G06F 21/41* (2013.01); *H04L 63/06* (2013.01); *H04W 12/04* (2013.01)

(58) Field of Classification Search
CPC ..... H04L 63/0815; H04L 63/06; G06F 21/41; H04W 12/04
See application file for complete search history.

(56) References Cited

U.S. PATENT DOCUMENTS

| | | | |
|---|---|---|---|
| 7,792,702 B1 | 9/2010 | Katz | |
| 8,095,972 B1 * | 1/2012 | Floyd | G06F 17/30902 726/9 |
| 9,148,460 B1 * | 9/2015 | Sun | H04L 63/0815 |
| 2003/0200465 A1 * | 10/2003 | Bhat | H04L 63/0815 726/8 |
| 2012/0214444 A1 * | 8/2012 | McBride | H04L 63/0807 455/411 |
| 2014/0082715 A1 * | 3/2014 | Grajek | G06F 17/30876 726/8 |
| 2014/0250511 A1 * | 9/2014 | Kendall | G06F 21/6281 726/6 |
| 2015/0026049 A1 | 1/2015 | Theurer | |

(Continued)

FOREIGN PATENT DOCUMENTS

WO 2015023800 A1 2/2015

OTHER PUBLICATIONS

Zhang et al., Architectural Design Patterns for SSO (Single Sign On) Design and Use Cases for Financial Web Applications, OWASP, 26 pages (Year: 2011).*

(Continued)

*Primary Examiner* — Huan V Doan
(74) *Attorney, Agent, or Firm* — Johnson, Marcou, Isaacs & Nix, LLC; George Marcou; Scott A. Hendrix

(57) ABSTRACT

Devices and methods for single sign-on and regulatory compliance involve a processor of a communication device executing a first entity application that stores user authentication data on a secure vault element of the communication device. Thereafter, the stored user authentication data is retrieved from the secure vault element by the processor executing a second entity application, and the processor executing the second entity application logs the user into the second entity application based on the user authentication data retrieved from the secure vault element without requiring entry of further user authentication data.

18 Claims, 3 Drawing Sheets

(56) References Cited

U.S. PATENT DOCUMENTS

2015/0188907 A1\* 7/2015 Khalid ............... H04L 63/0815
                                                        726/8
2016/0080361 A1\* 3/2016 Sondhi ................ H04L 63/102
                                                        726/8

OTHER PUBLICATIONS

Binu et al., A Single Sign on Based Secure Remote User Authentication Scheme for Multi-Server Environments, 6 pages (Year: 2014).\*
"Standardize, Innovate, Disrupt and Expand Digital Banking with Open APIs", FINEXTRA, Feb. 20, 2015, 6.
"Superwallets Mobile Banking—Reinvented", FINANTEQ, 2015, 7.
Adams, et al., "Santander Launches Mobile Wallet for In-App Purchases in Poland/ From Smartphones to Super Wallets: How a New Breed of Applications is Changing Mobile Banking", Payments Source, Apr. 15, 2014, 1.

\* cited by examiner

DEVICES AND METHODS FOR SINGLE SIGN-ON AND REGULATORY COMPLIANCE

FIELD OF THE INVENTION

The present invention relates generally to the field of single sign-on computer technology, and more particularly to devices and methods for single sign-on and "Know-Your-Customer" (KYC) regulatory compliance.

BACKGROUND OF THE INVENTION

In current single sign-on offerings, user sign-on information may be passed directly from one application to another to be authenticated, for example, on the backend. Further, in such currently available single sign-on offerings, an entity may store a basic profile for a user that is limited, for example, to the user's name and basic demographic information for the user, which the entity may furnish to other parties. Thus, in a typical single sign-on mechanism, when an application uses an authentication specification, the application actually uses a third party's identification or authentication mechanism and does not itself store the authentication information, which is delegated to the third party. Such third party authenticates a user and then provides the calling or hosting application a profile of the user, such as a username or simplistic demographic information.

There is a present need for a single sign-on mechanism that may, for example, store a user's profile to be accessed separately by cooperating applications. There is a further need for a single sign-on mechanism that may, for example, employ cooperating applications belonging to the same group and involve storing user profile information within a user interface that is accessible only by the cooperating applications as long as a current user session remains active. There is a still further need for a single sign-on mechanism that may, for example, enable a user who accesses and is authenticated by one of the cooperating applications to access another of the cooperating applications and sign up for an account on such other application without re-authenticating or entering KYC information (if required for opening the account) on the other application.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the automated data privacy compliance described herein. Embodiments of the invention provide methods that may involve, for example, storing, by a processor of a communication device, such as smart phone, executing a first entity application, user authentication data on a secure vault element of the communication device; retrieving, by the processor of the communication device executing a second entity application, the stored user authentication data from the secure vault element of the communication device; and logging, by the processor of the communication device executing the second entity application, the user into the second entity application based on the user authentication data retrieved from the secure vault element of the communication device.

In further aspects of embodiments of the invention, storing the user authentication data may involve, for example, receiving entry of the user authentication data by the processor of the communication device executing the first entity application. In other aspects, storing the authentication data may involve, for example, communicating the received user authentication data by the processor of the communication device executing the first entity application to a processor of a backend server of the first entity for authentication. In additional aspects, storing the authentication data may involve, for example, returning a user authenticated message by the processor of the backend server of the first entity to the processor of the communication device executing the first entity application. In still further aspects, storing the user authentication data may involve, for example, encrypting the user authentication data by a processor of the communication device executing the first entity application. In still other aspects, storing the user authentication data may involve, for example, storing an encrypted token consisting at least in part of the user authentication data by a processor of the communication device executing the first entity application.

In additional aspects of embodiments of the invention, retrieving the stored user authentication data may involve, for example, launching the second entity application from the first entity application executing on the processor of the communication device. In other aspects, launching the second entity application from the first entity application may involve, for example, launching the second entity application from a link to the second entity application embedded in the first entity application executing on the processor of the communication device. In further aspects retrieving the stored user authentication data may involve, for example, communicating the retrieved user authentication data by the processor of the communication device executing the second entity application to a processor of a backend server of the first entity for user authentication validation.

In additional aspects of embodiments of the invention, retrieving the stored user authentication data may involve, for example, communicating the retrieved user authentication data by the processor of the communication device executing the second entity application via a processor of a backend server of the second entity to the processor of the backend server of the first entity for user authentication validation. In other aspects, retrieving the stored user authentication data may involve, for example, returning a user authentication validated message by the processor of the backend server of the first entity to the processor of the communication device executing the second entity application. In further aspects, logging the user into the second entity application may involve, for example, logging the user into second entity application executing on the processor of the communication device based on the retrieved user authentication data without requiring entry of further user authentication data.

Other aspects of embodiments of the invention may involve, for example, logging, by the processor of the communication device executing a succeeding entity application, the user into the succeeding entity application based on the stored user authentication data without requiring entry of further user authentication data. Still other aspects may involve, for example, logging, by the processor of the communication device executing one of a plurality of entity applications, the user into said one of the plurality of entity applications executing on the processor of the communication device based on the stored user authentication data retrieved from the secure vault element by the processor of the communication device executing said one of the plurality of entity applications without requiring further entry of user authentication data.

Additional aspects of embodiments of the invention may involve, for example, storing regulatory compliant user financial data with the user authentication data on the secure vault element of the communication device by the processor of the communication device executing the first entity application. Other aspects may involve, for example, retrieving the stored user authentication data and regulatory compliant user financial data from the secure vault element of the communication device by the processor of the communication device executing the second entity application. Still other aspects may involve, for example, logging the user into the second entity application and opening a second entity account for the user based on the retrieved user authentication data and regulatory compliant user financial data without requiring entry of further user authentication data or regulatory compliant user financial data.

Embodiments of the invention also provide devices that may employ, for example, a processor; a secure vault element; the processor storing a first entity application that when executed instructs the processor to store user authentication data on the secure vault element of the communication device and at least one additional entity application that when executed instructs the processor to retrieve the stored user authentication data from the secure vault element of the communication device and log the user onto the at least one additional entity application based on the user authentication data retrieved from the secure vault element of the communication device without requiring entry of further user authentication data.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Figure 1:
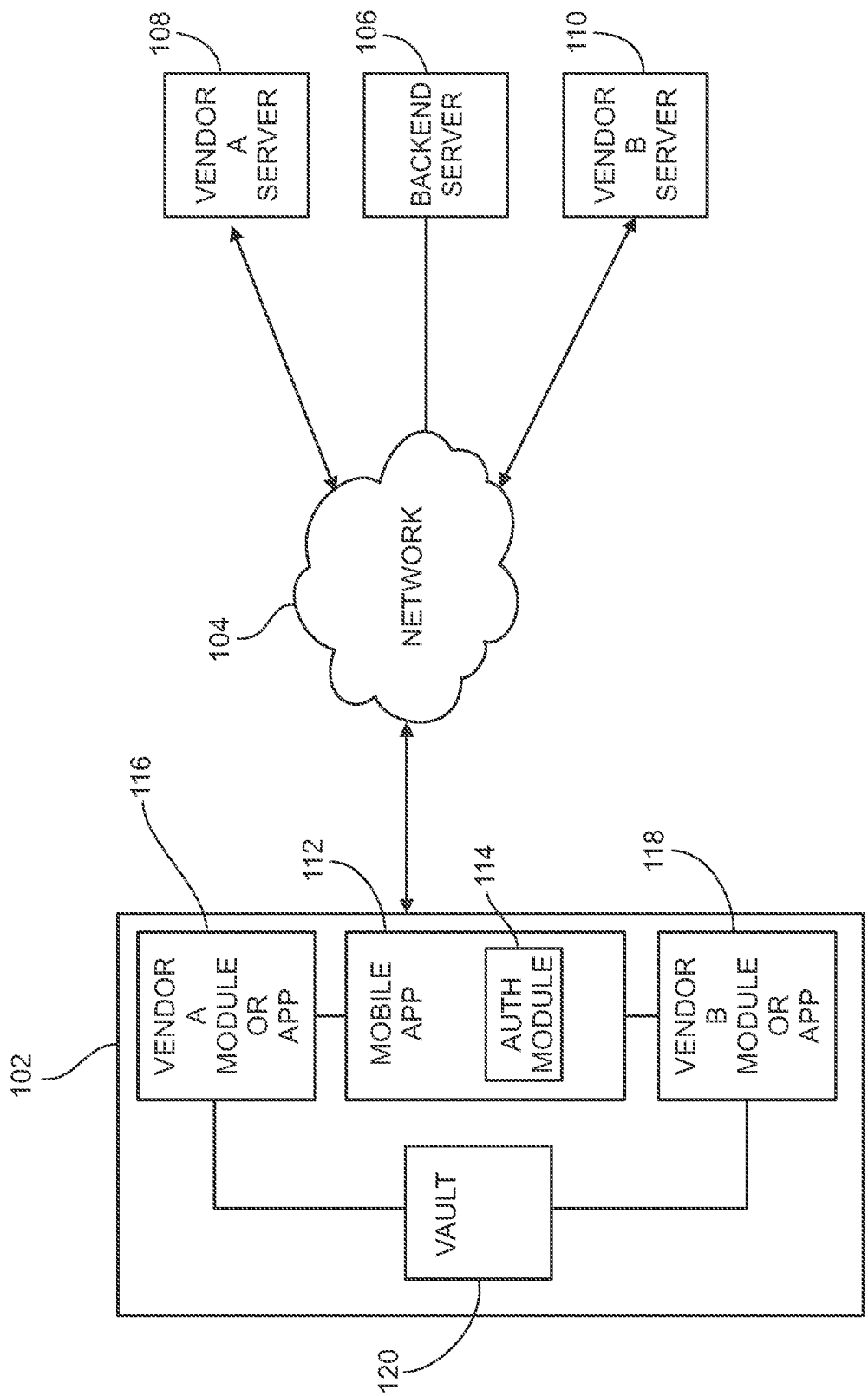
FIG. 1 is a schematic diagram that illustrates an overview example of components and the flow of information between components for embodiments of the invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

An aspect of embodiments of the invention provides a novel way of toggling between two cooperating applications that involves, for example, a single sign-on mechanism whereby a user signs into one application and seamlessly transitions into a second, cooperating application. In embodiments for the invention, an application may be created at design time, for example, with at least two schemes for cooperation between two applications. A first such scheme may relate, for example, to the user interface client side, and a second such scheme may relate to the server side.

The single sign-on mechanism for embodiments of the invention may enable a user to move from a first application to a second application without re-credentialing on the second application. Thus, a user may move between the applications seamlessly from a user's perspective without signing onto the second application. On the server side, embodiments of the invention ensure that two such applications may have a way of indirectly exchanging tokens and that the token related to a first application is honored via cryptographic means, such as public key mechanism, by the second application.

Thus, if a first application wishes to enable communication with a second application, a token may be presented from the client side to a backend server, which may validate the token with a source application through a single sign-on protocol that may be implemented in the backend. On the front end or client side, the token for embodiments of the invention that enables a user to be passed seamlessly from a first application to a second application may be securely stored in a vault on a user interface (UI), such as a user's mobile device.

Embodiments of the invention may provide different modes of integration with applications of vendors or other third parties. For example, in a modularized aspect, third party applications may be packaged within an application, which may be referred to as a wrapper application, of the service provider. For another example, in a cooperating application aspect, third party applications may be stand-alone applications that are launched from the service provider application. It will be appreciated that this modularized aspect may involve a greater degree of control by the service provider of how the third parties may package their applications.

FIG. 1 is a schematic diagram that illustrates an overview example of components and the flow of information between components for embodiments of the invention. Referring to FIG. 1, a user's device 102, such as a user's smart phone, may have one or more processors communicably coupleable, for example, via a network 104 to one or more processors of a backend server 106 of a service provider and one or more processors of one or more third party servers, such as a vendor A server 108 and a vendor B server 110.

Referring further to FIG. 1, the user's device 102 may include a mobile application 112 of a service provider, such as a financial institution, with an authentication module 114 and one or more third party modules or cooperating applications, such as a vendor A module or application 116 and a vendor B module or application 118, running on the one or more processors of the device 102. In addition, the user's device 102 may include a secure vault 120, such as KEYCHAIN developed by APPLE, which may be accessed from time-to-time by each of the provider's application 112, the vendor A module 116, and the vendor B module 118. It is to be understood, that embodiments of the invention are not limited to the foregoing KEYCHAIN example and may employ any other suitable secure token storage, such as a secure physical hardware or software element or a combination of hardware and software elements on the user's device 102.

In the cooperating applications aspect for embodiments of the invention, the third parties' applications may be independent but cooperating applications. For example, the service provider's application and the third parties' cooperating applications may share a same group identifier (ID), which allows all applications in the group to share the secure vault 120 where secure authentication tokens may be saved and retrieved by the cooperating applications. Such secure tokens may contain session information that can be used to validate a user. The secure tokens may also contain information necessary to deep drop (e.g., via deep linking) a user to a specific module within a particular third party application.

In either aspect of embodiments of the invention, information may be passed from the user's device 102 to the service provider's backend server 106 utilizing an open standard format, such as JavaScript Object Notation (JSON), data stream. In addition, embodiments of the invention may provide a mechanism for addressing how a token may be deep dropped from one module or application to another module or application. For example, if a user who is signed in to a first module or application wishes to use a payment or an "offers" functionality present in a second module or application, the second module or application may be launched when it receives the token through the single sign-on mechanism. In this way, the user may be deep dropped into the second module or application that fulfills the payment or "offers" functionality.

The token for embodiments of the invention may be securely stored in the secure vault 120 on the user's device 102. Embodiments of the invention ensure that only the modules or cooperating applications A 116 and B 118 may have access to the secure vault 120. Thus, embodiments of the invention may employ certificates that may be exchanged. In addition, the modules or cooperating applications A 116 and B 118 may be identified as belonging to a single group with a group ID that may allow only the modules or applications A 116 and B 118 to access the token on the secure vault 120 of the user's device 102.

As noted, the modules or applications for embodiments of the invention may run on one or more processors of a user's communication device 102, such as a user's mobile smart phone device. For example, the user may download the modules or cooperating applications from an app store, or they may be pre-installed on the user's device. Thus, if only a first of two or more modules or cooperating applications is pre-installed on the user's device 102, and a second of the two or more modules or cooperating applications is not already installed on the user's device, the single sign-on mechanism for embodiments of the invention may point the user to a link in the first module or application to the app store that may allow the user to download the second module or application that is missing.

For another example, assume that both a first and a second of two modules or cooperating applications for embodiments of the invention are already installed on the user's device 102. Assume also that the user is logged into the first of the two modules or applications, but the second module or cooperating application is inactive or is in the background. When the user wishes to move, for example, from the first module or cooperating application to the second module or cooperating application, the single sign-on mechanism for embodiments of the invention may awaken or launch the second module or cooperating application and deep drop the token for embodiments of the invention into the second module or cooperating application as specified on the token.

It is to be understood that the modules or cooperating applications for embodiments of the invention may not communicate directly with one another but may instead simply access the secure vault 120 where the token is stored. Thus, for example, once the second module or cooperating application accesses the token stored on the secure vault 120, the second module or cooperating application may use a server portion of the token to validate to the backend server 106 that the token is valid and belongs to the user and that there is a session active for the particular user. The single sign-on mechanism for embodiments of the invention may provide and pass information, such as session ID information, which keeps the user's session open.

Figure 2:
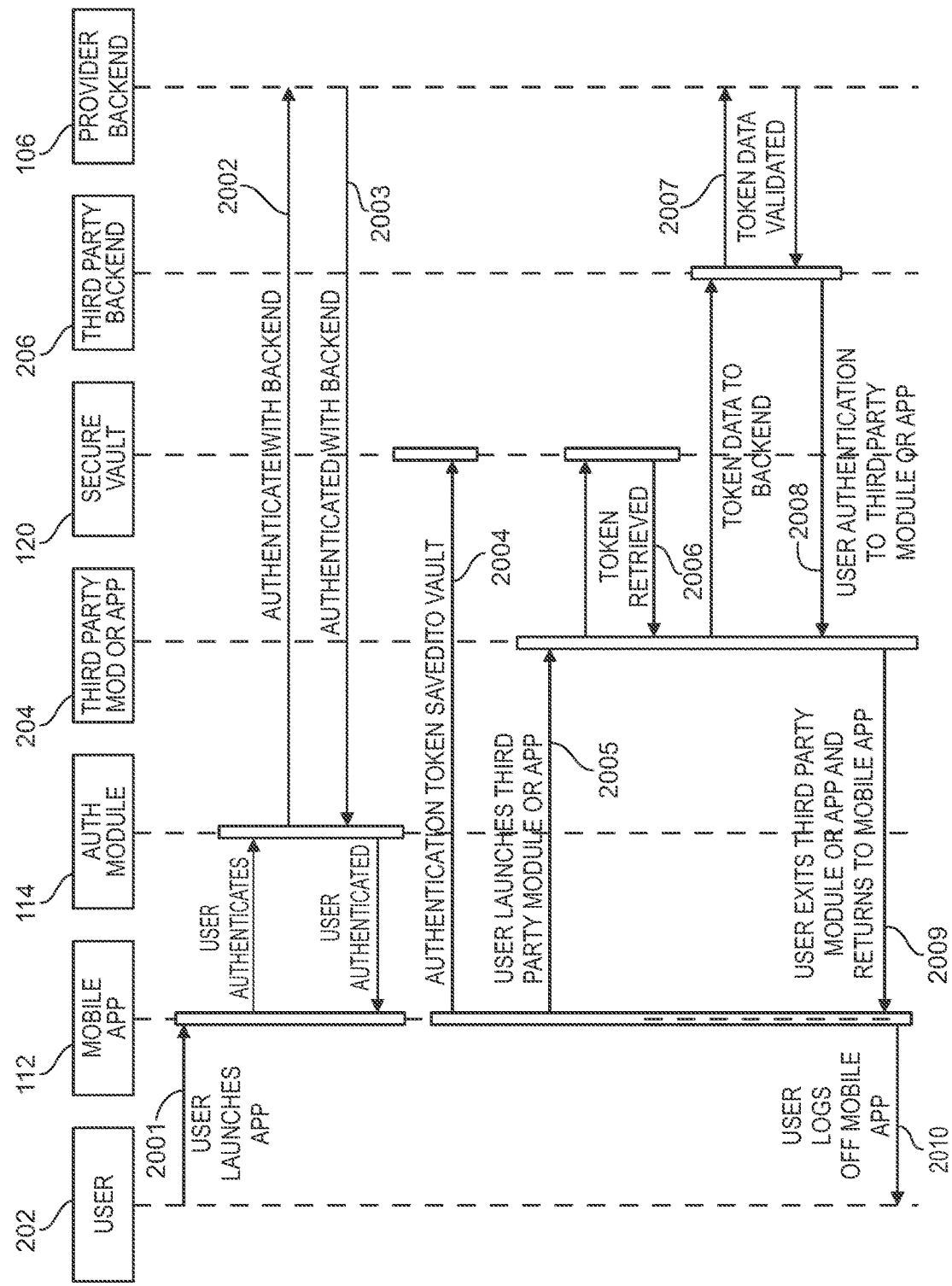
FIG. 2 is a schematic diagram that illustrates an example single sign-on use case for embodiments of the invention.

FIG. 2 is a schematic diagram that illustrates an example single sign-on use case for embodiments of the invention. Referring to FIG. 1 and FIG. 2, embodiments of he invention may employ, for example, the modularized approach wherein an application 112 of a service provider, such as a financial institution, may be at a topmost level and may be referred to as a wrapper application that may execute a plurality of third parties' modules on the user's device 102. Alternatively, embodiments of the invention may employ, for example, the cooperating applications approach wherein the third parties' applications may be independent but cooperating applications that share a same group ID with one another and with the service provider's application.

Referring again to FIGS. 1 and 2, at 2001, a user 202 may log on and launch the service provider's application 112, and at 2002, the user's credentials may be submitted via the service provider's authentication module 114 to the provider's backend server 106 via the service provider's authentication module 114. At 2003, the provider's backend server 106 may authenticate the user and return an authentication message via the service provider's authentication module 114 to the provider's application 112. Thereafter, at 2004, the service provider's application 112 may generate, encrypt, and save a secure user authentication token to the secure vault 120, and the user 202 may perform an action on the provider's application 112.

Referring further to FIGS. 1 and 2, if the user 202 wishes to interact with another functionality, at 2005, the user may launch a third party module or cooperating application, such as third party module or application 204. At 2006, the third party module or application may retrieve the secure user authentication token from the secure vault 120 and, at 2007, send the token data via the third party backend server 206 to the provider backend server 106 for validation. Thereafter, the provider backend server 106 may validate the token data and, at 2008, may return a user authentication message via the third party backend server 206 to the third party module or application 204. After performing an action on the third party module or application 204, at 2009, the user 202 may exit the third party module or application and return to the provider's application 112. At that point, the user may log off the provider's application 112 at 2010.

In embodiments of the invention, rather than navigating back to the provider's application 112, the user 202 may wish to navigate to another module or cooperating application. In that case, the user 202, who is signed on the third party module or application 206, may trigger an event by clicking on an icon presented, for example, by the third party module or application that may represent an embedded link to such other module or cooperating application. When the user 202 clicks on the link, the user may be taken to such other module or cooperating application without requiring the user to re-authenticate on the other module or application.

For example, referring to FIG. 1, a user who is signed on to the vendor A module or cooperating application 116 may click on a link to the vendor B module or cooperating application 118 that is displayed by the vendor A module or cooperating application for a function, such as movement of funds between bank accounts of the user or access to offers, that are not available on the vendor A module or application. When the user 202 clicks on the link, the user may be taken to the vendor B module or application 118 without requiring the user to provide user credentials or otherwise re-authenticate on the vendor B module or application.

Thus, in the single sign-on mechanism for embodiments of the invention, the vendor B module or application 118 may retrieve the secure user authentication token from the secure vault 120 and send the token data via the vendor B backend server 110 to the provider backend server 106 for validation. Thereafter, the provider backend server 106 may validate the token data and return a user authentication message via the vendor B backend server 110 to the vendor B module or application 118. The user 202 may then perform an action on the vendor B module or application 118 without re-authenticating.

In moving the user 202 between one or more third party modules or cooperating applications without requiring re-authentication, when an event is triggered by the user, a common value, such as the shared session ID, may be modified or updated to indicate that the user's session remains active and returned to the service provider's application 112. In embodiments of the invention, the user 202 may be required to be actively engaged, for example, with one of the modules or cooperating applications in order to keep a session alive. Thus, after a period of user inactivity, such as a pre-determined number of minutes of such inactivity, a current user session may time out, in which case the user 202 may be automatically logged off by the service provider's application 112.

As noted, when the user 202 triggers an event, such as clicking on a link presented by the vendor A module or cooperating application 116 to be transferred to the vendor B module or cooperating application 118, triggering the event indicates that the session remains active. Thus the common value or session ID may be updated and returned to the service provider's application 112. So long as a session continues to be updated with such events before expiration of a predefined timeout period, the session may remain active on a particular module or application. By periodically clicking on some aspect, for example, of one of two or more modules or cooperating applications before the timeout period, the user 202 may remain signed on to all such modules or applications.

Assume, for example, that a particular module or cooperating application, such as the vendor A module or application 116, is focused on how to redeem offers through awards and that another module or cooperating application, such as the vendor B module or application 118, is focused on actually redeeming coupons and reward points. In such example, the user 202 may initially launch the service provider's application 112, authenticate to the service provider's backend server 106 via the service provider's authentication module 114, and then select the vendor A module or application 116 focused on how to redeem offers without further authentication. Thereafter, the user 202 may select the vendor B module or application 118 and redeem coupons or rewards, also without further authentication.

Thus, in the foregoing example, the user 202 may determine, for example, on the vendor A module or cooperating application 116 how many rewards points the user has available for spending and move to the vendor B module or cooperating application 118 to redeem some or all of those rewards points. In addition, the vendor B module or cooperating application 118 may, for example, have a cooperating relationship with still another vendor on whose module or cooperating application the user 202 may then use the redeemed points for shopping, likewise without re-authenticating. Once the user 202 has finished shopping, the user may return, for example, to any of the provider's application 112 or the vendor A 116 or B 118 module or application and perform other actions without re-authentication. Alternatively, the user may access a still further module or cooperating application, for example, for news or chat functionality that is not available in any of the other modules or cooperating applications, likewise without re-authentication.

As noted, in the modularized approach for embodiments of the invention, the service provider's application 112 may be a wrapper application running on the user's mobile device 102 having one or more vendor modules as components of the wrapper application. As also noted, embodiments of the invention are not limited to the modularized approach, and embodiments of the invention may instead employ the cooperating applications approach in which one or more cooperating, standalone applications entirely separate from the service provider's application 112 may call into the service provider's application using an a priori handshake exchange in the service provider's backend 106.

It is to be understood that in embodiments of the invention, the vendor modules or cooperating applications do not communicate directly with one another. Instead, the vendor modules or applications may separately access an encrypted token that may include, for example, the user's financial profile stored on the secure vault 120 on the user's device 102. Thus, in embodiments of the invention, no direct communication may occur between the modules or cooperating applications when the user clicks on a link in one of the modules or cooperating applications that points to a URL that represents an area where another of the applications is located.

Instead, when a module or cooperating application for embodiments of the invention is launched, as part of the launching mechanism, the module or application may look to the secure vault 120 for a token that was agreed upon at design time. Further, only the modules or cooperating applications have access to that token, which is stored in the secure vault 120. For example, when a particular module or cooperating application accesses the token, that module or application may determine which other module or cooperating application the user intends to launch. The particular module or application may also make a call to the provider's backend server 106 to confirm that a session is open that supports the particular user.

As noted, the secure vault 120 for embodiments of the invention may be hardware, such as a secure element, on the user's device 102, or it may be a secure store such as KEYCHAIN introduced in MAC IOS ecosystem to keep track, for example, of passwords, applications, encryption keys and digital certificates. For example, the KEYCHAIN may have a secure enclave that stores a group ID for the modules or cooperating applications, and values may be searched and retrieved from the secure enclave. The key of the group ID and the group ID may be established at design time and may be known and accessed only by the modules or cooperating applications. In addition, all of the group information may be embedded in a digital certificate. The information in the token may be the key of the particular group ID, and all may reside inside the secure vault 120.

Another aspect of embodiments of the invention may relate, for example, to Know-Your-Customer (KYC), a process of a business verifying the identity of its clients, which may be mandated by one or more governmental laws or regulations. When a user wishes to open, for example, a financial account with a financial services entity, the user must provide certain information to the financial services entity. For example, the user may be required to provide formal identity information, such as a user's social security number and address. The financial services entity may be required by law and/or regulation to collect this information from the user in order to open any financial account.

In the KYC aspect, as part of enrolling a user to a third party's application, embodiments of the invention may involve, for example, creating a financial profile for the user during the single sign-on process described herein and presenting the financial profile for the user to the third party. Thus, embodiments of the invention may enable a service provider to pass on encrypted KYC information to another entity that may provide, for example, separate financial services to allow a user to sign on and open an account on the other entity's module or cooperating application without further authentication or KYC information.

In currently available single sign-on offerings, an entity may store a basic profile for a user that is limited, for example, to the user's name and basic demographic information for the user, which the entity may furnish to other parties. Thus, in a typical single sign-on mechanism, when an application uses an authentication specification, such as OpenID, the application actually uses a third party's identification or authentication mechanism and does not itself store the authentication information, which is delegated to the third party. Such third party authenticates a user and then provides the calling or hosting application a profile of the user, such as a username or simplistic demographic information.

Embodiments of the invention propose, for example, a process that is financially oriented by which a service provider, such as a financial institution, may provide authentication for other financial service entities. Thus, when a user signs up as a customer with the service provider using the single sign-on mechanism for embodiments of the invention, the service provider may provide a financial profile of the particular customer. Such customer's financial profile for embodiments of the invention may be an augmentation of a standard demographic profile that adds other information, such as finance-related information that is important to financial service entities. Further, The customer's financial profile may be included in the encrypted single sign-on token for embodiments of the invention.

In the KYC aspect of embodiments of the invention, a user's encrypted KYC information in connection, for example, with an application of a first entity may be passed to a cooperating application of a second entity with which the user does not have an account for use in opening and setting up an account with the second entity on the application of the second entity. Thus, when the user in an application, such as module or cooperating application A 116 or B 118 shown in FIG. 1, wishes to sign up, for example, to an account with the owner of the application, the particular module or application may retrieve the encrypted token from the secure vault 120 and present the token to the service provider's backend server 106 for validation. When validated, based upon the user's credentials, the user's financial profile may then be sent to the particular calling module or application.

Currently, there are a significant number of relatively new businesses, such as financial service companies, that are striving to acquire new customers, but in order for a user to create an account with and access the services of such a financial services company, the user must furnish KYC information to that company. The KYC aspect for embodiments of the invention may enable a financial institution, such as a bank, to share its KYC information with such businesses. In the KYC aspect, since the bank has previously tokenized the user's KYC information, the bank may provide that information securely to another financial services company without requiring the customer to input any KYC information. The KYC aspect for embodiments of the invention may build a specifically tailored financial profile, including KYC information, for a user that may be used to fulfill the KYC obligations of entities, such as other financial services companies.

For example, the service provider application 112 may have a link represented by an icon on the display screen of the user's mobile device 102 that when clicked on by the user may call up a module or cooperating application of a financial service company with which the service provider may have a prior arrangement for the single sign-on mechanism according to embodiments of the invention. In addition, a message may be displayed by the module or cooperating application of the financial service company to inform the user, for example, that in order for the user to sign up for an account with the particular financial service company, the user's KYC information must be furnished to that company.

The KYC aspect for embodiments of the invention may enable the service provider to provide the user's KYC information to the particular financial services company. Thus, the service provider may authenticate the user to, and share session ID information with, the financial services company, and once a user is authenticated within the service provider's application 112, based on prior arrangements with the financial services entity, that entity may use the service provider's session criteria and access the service provider's backend server 106 to obtain the customer's KYC information. Thus, the next time the user clicks on a button or icon representing the particular entity's module or cooperating application displayed by the service provider's application, the user is already authenticated as a user of the financial services company's application, based on authentication by the service provider's application.

The single sign-on aspect of embodiments of the invention is a vast improvement over existing single sign-on offerings, which merely allow a user to move from one application to another without re-authenticating. For example, the single sign-on aspect for embodiments of the invention provides cooperating applications belonging to a same group and may also involve storing encrypted user profile information on a secure vault within a user interface that is accessible only by the cooperating applications. Further, the user profile information may be accessed by any of the cooperating applications as long as a current user session remains active as confirmed by session ID information.

In addition, a user who accesses and is authenticated by one of the cooperating applications may access another of the cooperating applications and sign up for an account on the other application without re-authenticating or entering KYC information (if required for opening the account) on the other application. Unlike current single sign-on offerings in which user sign-on information may be passed directly from one application to another to be authenticated, for example, on the backend, embodiments of the invention store the user's profile in an encrypted token on a secure vault of the UI, which cooperating applications may access separately.

It is to be understood that use case shown in FIG. 2 is an example only and that embodiments of the invention are not limited to such use case. For example, in embodiments of the invention, upon retrieving the token from the secure vault 120 at 2006, instead of sending the token data to the provider backend server 106 via the third party backend server 206 for validation, the third party module or application 204 may itself validate the token data without re-authenticating the user. In such example, one or more additional third party modules or cooperating applications may likewise validate the token data retrieved from the secure vault 120 without re-authenticating the user.

Figure 3:
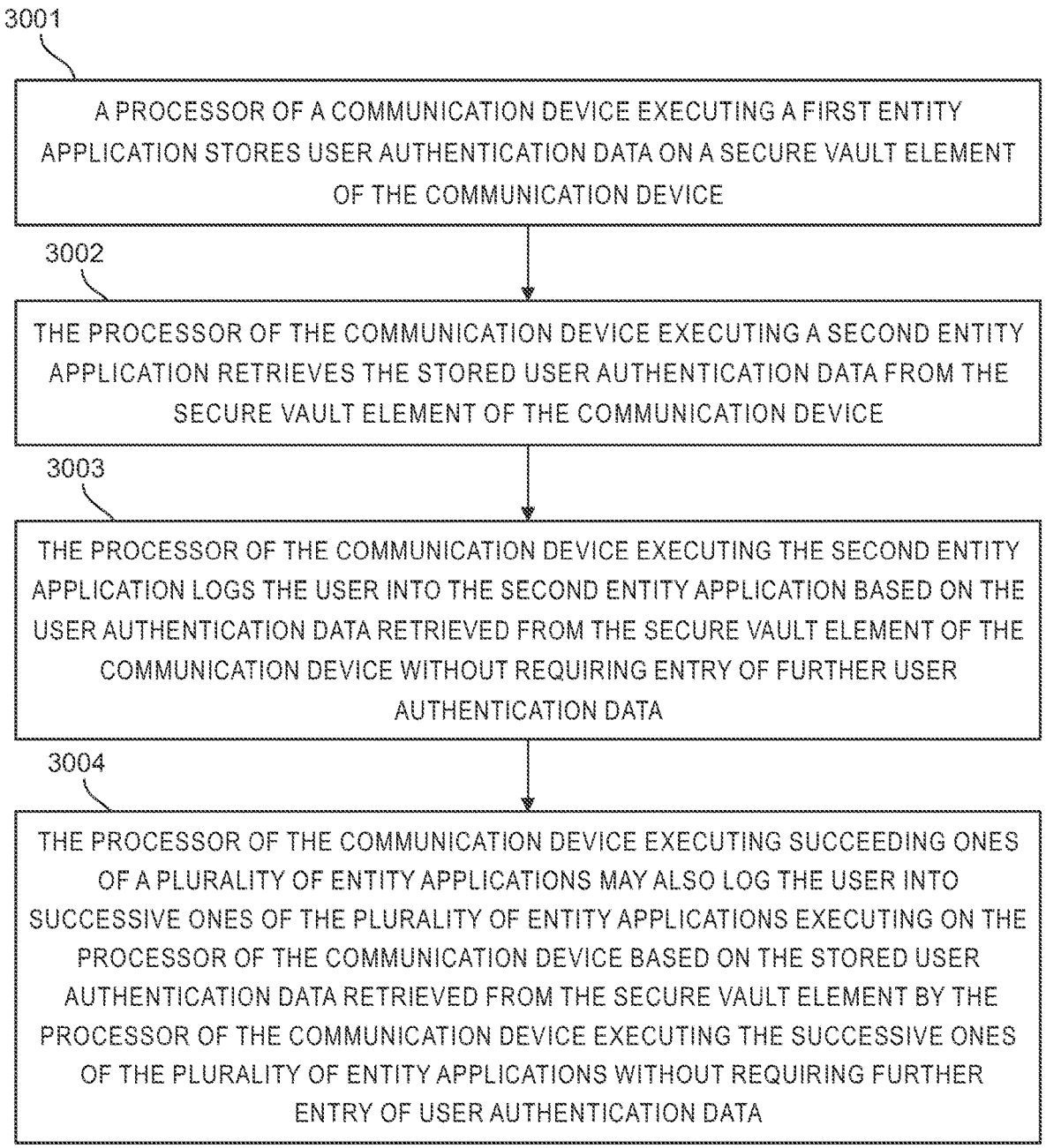
FIG. 3 is a flow chart that illustrates an example of the single sign-on process for embodiments of the invention.

FIG. 3 is a flow chart that illustrates an example of the single sign-on process for embodiments of the invention. Referring to FIG. 3, at 3001, a processor of a communication device executing a first entity application may store user authentication data on a secure vault element of the communication device. At 3002, the processor of the communication device executing a second entity application may retrieve the stored user authentication data from the secure vault element of the communication device. At 3003, the processor of the communication device executing the second entity application may log the user into the second entity application based on the user authentication data retrieved from the secure vault element of the communication device without requiring entry of further user authentication data. At 3004 the processor of the communication device executing succeeding ones of a plurality of entity applications may continue to log the user into successive ones of the plurality of entity applications executing on the processor of the communications device based on the stored user authentication data retrieved from the secure vault element by the processor of the communication device executing the successive ones of the plurality of entity applications without requiring further entry of user authentication data.

It is to be understood that embodiments of the invention may be implemented as processes of a computer program product, each process of which is operable on one or more processors either alone on a single physical platform, such as a single computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general, such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A method, comprising:
   storing, by a processor of a communication device executing an application of a first entity, user authentication data on a secure vault element of the communication device consisting at least in part of a secure hardware element and accessible only by each of the application of the first entity and an application of at least one second entity executing on the processor of the communication device;
   retrieving, by the processor of the communication device, the stored user authentication data from the secure vault element of the communication device consisting at least in part of the secure hardware element and accessible only by the application of the first entity and the application of the at least one second entity executing on the processor of the communication device;
   logging, by the processor of the communication device, the user into the application of the at least one second entity based on the user authentication data retrieved from the secure vault element of the communication device consisting at least in part of the secure hardware element and accessible only by the application of the first entity and the application of the at least one second entity executing on the processor of the communication device;
   directing, by the processor of the communication device, the application of the at least one second entity to open at a particular module of the application of at least one second entity;
   receiving, by the processor of the communication device, an interaction from a user with the application of the at least one second entity; and
   maintaining, by the processor of the communication device, an active status of the application of a first entity based on the received interaction from the user with the application of the at least the one second entity.

2. The method of claim 1, wherein storing the user authentication data further comprises receiving entry of the user authentication data by the processor of the communication device executing the application of the first entity.

3. The method of claim 2, wherein storing the authentication data further comprises communicating the received user authentication data by the processor of the communication device executing the application of the first entity to a processor of a backend server of the first entity for authentication.

4. The method of claim 3, wherein storing the authentication data further comprises returning a user authenticated message by the processor of the backend server of the first entity to the processor of the communication device executing the application of the first entity.

5. The method of claim 1, wherein storing the user authentication data further comprises encrypting the user authentication data by a processor of the communication device executing the application of the first entity.

6. The method of claim 1, wherein storing the user authentication data further comprises storing an encrypted token consisting at least in part of the user authentication data by a processor of the communication device executing the application of the first entity.

7. The method of claim 1, wherein retrieving the stored user authentication data further comprises launching the application of the at least one second entity from the application of the first entity executing on the processor of the communication device.

8. The method of claim 7, wherein launching the application of the at least one second entity from the application of the first entity further comprises launching the application of the at least one second entity from a link to the application of the at least one second entity embedded in the application of the first entity executing on the processor of the communication device.

9. The method of claim 1, wherein retrieving the stored user authentication data further comprises communicating the retrieved user authentication data by the processor of the communication device executing the application of the at least one second entity to a processor of a backend server of the first entity for user authentication validation.

10. The method of claim 9, wherein retrieving the stored user authentication data further comprises communicating the retrieved user authentication data by the processor of the communication device executing the application of the at least one second entity via a processor of a backend server of the at least one second entity to the processor of the backend server of the first entity for user authentication validation.

11. The method of claim 10, wherein retrieving the stored user authentication data further comprises returning a user authentication validated message by the processor of the backend server of the first entity to the processor of the communication device executing the application of the at least one second entity.

12. The method of claim 1, wherein logging the user into the application of the at least one second entity further comprises logging the user into the application of the at least one second entity executing on the processor of the communication device based on the retrieved user authentication data without requiring entry of further user authentication data.

13. The method of claim 1, further comprising logging on, by the processor of the communication device executing an application of at least one third entity, the user to the application of the at least one third entity based on the stored user authentication data without requiring entry of further user authentication data.

14. The method of claim 1, further comprising logging, by the processor of the communication device executing an application of one of a plurality of succeeding entities, the user into the application of one of the plurality of succeeding entities executing on the processor of the communications device based on the stored user authentication data retrieved from the secure vault element of the communication device consisting at least in part of the secure hardware element and accessible only by the application of the first entity and the application of the at least one second entity executing on the processor of the communication device by the processor of the communication device executing the application of one of the plurality of succeeding entities without requiring further entry of user authentication data.

15. The method of claim 1, further comprising storing regulatory compliant user financial data with the user authentication data on the secure vault element of the communication device consisting at least in part of the secure hardware element and accessible only by the application of the first entity and the application of the at least one second entity executing on the processor of the communication device by the processor of the communication device executing the application of the first entity.

16. The method of claim 15, further comprising retrieving the stored user authentication data and regulatory compliant user financial data from the secure vault element consisting at least in part of the secure hardware element and accessible only by the application of the first entity and the application of the at least one second entity executing on the processor of the communication device of the communication device by the processor of the communication device executing the application of the at least one second entity.

17. The method of claim 16, further comprising logging the user into the application of the at least one second entity and opening an account with the at least one second entity for the user based on the retrieved user authentication data and regulatory compliant user financial data without requiring entry of further user authentication data or regulatory compliant user financial data.

18. A device, comprising:
a processor of a communication device; and
a secure vault element of the communication device consisting at least in part of a secure hardware element and accessible only by each of an application of a first entity and an application of at least one additional entity executing on the processor of the communication device;
wherein the processor of the communication device storing the application of the first entity that when executed instructs the processor of the communication device to:
store user authentication data on the secure vault element of the communication device consisting at least in part of the secure hardware element and accessible only by each of the application of the first entity and the application of the at least one additional entity executing on the communication device processor;
retrieve the stored user authentication data from the secure vault element of the communication device consisting at least in part of the secure hardware element and accessible only by each of the application of the first entity and the application of the at least one additional entity executing on the communication device processor;

log the user on the application of the at least one additional entity based on the user authentication data retrieved from the secure vault element of the communication device consisting at least in part of the secure hardware element and accessible only by the application of the first entity and the application of the at least one additional entity executing on the processor of the communication device without requiring entry of further user authentication data;
direct the application of the at least one additional entity to open at a particular module of the application of the at least one additional entity;
receive an interaction from a user with the application of the at least one additional entity; and
maintain an active status of the application of a first entity based on the received interaction from the user with the application of the at least one additional entity.

\* \* \* \* \*